United States Patent
Osuka

(10) Patent No.: US 10,659,625 B2
(45) Date of Patent: May 19, 2020

(54) IMAGING DEVICE AND IMAGE TRANSFER METHOD

(71) Applicant: Panasonic Intellectual Property Management Co., Ltd., Osaka (JP)

(72) Inventor: Kyosuke Osuka, Osaka (JP)

(73) Assignee: Panasonic Intellectual Property Management, Co., Ltd., Osaka (JP)

( * ) Notice: Subject to any disclaimer, the term of this patent is extended or adjusted under 35 U.S.C. 154(b) by 0 days.

(21) Appl. No.: 16/007,744

(22) Filed: Jun. 13, 2018

(65) Prior Publication Data

US 2019/0014226 A1 Jan. 10, 2019

(30) Foreign Application Priority Data

Jul. 5, 2017 (JP) .................................. 2017-132225

(51) Int. Cl.
*H04N 1/00* (2006.01)
*H04N 5/77* (2006.01)
(Continued)

(52) U.S. Cl.
CPC ..... *H04N 1/00103* (2013.01); *H04N 1/00307* (2013.01); *H04N 5/765* (2013.01);
(Continued)

(58) Field of Classification Search
CPC .......... G08B 13/1966; H04N 1/32776; H04W 84/12; H04W 4/008; G06F 21/35; G06F 21/43
(Continued)

(56) References Cited

U.S. PATENT DOCUMENTS

2007/0127081 A1* 6/2007 Kimoto .............. H04N 1/32786
358/400
2007/0254596 A1* 11/2007 Corson ................. H04L 5/0035
455/68

(Continued)

FOREIGN PATENT DOCUMENTS

| JP | 2003-051774 | 2/2003 |
| JP | 2008-053974 | 3/2008 |
| JP | 2016-178638 | 10/2016 |

*Primary Examiner* — Xi Wang
(74) *Attorney, Agent, or Firm* — Renner, Otto, Boisselle & Sklar, LLP

(57) ABSTRACT

An imaging device includes an imaging unit, a recording medium, a communication unit, and a controller. In a case where an unsent piece of image data is present in the recording medium when the communication unit automatically establishes a new connection with a first external apparatus, when the first external apparatus is identical to an external apparatus having been connected with the communication unit at a time of generation of the unsent piece of the image data, of a plurality of external apparatuses, the controller allows the communication unit to automatically transfer the unsent piece of the image data to the first external apparatus. When the first external apparatus is different from the external apparatus having been connected with the communication unit at the time of generation of the unsent piece of the image data, the controller forbids the communication unit to automatically transfer the unsent piece of the image data to the first external apparatus.

7 Claims, 13 Drawing Sheets

(51) Int. Cl.
*H04N 5/765* (2006.01)
*H04W 76/14* (2018.01)
*H04W 84/12* (2009.01)

(52) U.S. Cl.
CPC ............... *H04N 5/77* (2013.01); *H04N 5/772* (2013.01); *H04W 76/14* (2018.02); *H04N 2201/0084* (2013.01); *H04W 84/12* (2013.01)

(58) Field of Classification Search
USPC ..... 348/211.3, 207.1, 208.11, 211.99, 211.2, 348/211.4, 211.1, 211.12
See application file for complete search history.

(56) References Cited

U.S. PATENT DOCUMENTS

| 2009/0037515 | A1* | 2/2009 | Zapata | H04L 43/0811 709/202 |
| 2009/0059028 | A1* | 3/2009 | Kollias | A61B 5/0071 348/222.1 |
| 2009/0147088 | A1* | 6/2009 | Nagatomo | H04N 1/2125 348/207.2 |
| 2010/0297939 | A1* | 11/2010 | Fujita | H04W 4/00 455/41.1 |

* cited by examiner

FIG. 4

UNSENT-IMAGE LIST 190

| FILE ID | SHOOTING TIME | DESTINATION |
|---|---|---|
| P100-0001.jpg | 2017/6/5 10:00 | smartphone A |
| P100-0002.jpg | 2017/6/5 10:05 | smartphone A |
| P100-0003.jpg | 2017/6/5 10:10 | smartphone A |
| P100-0004.jpg | 2017/6/5 10:20 | smartphone A |
| P100-0005.jpg | 2017/6/5 11:00 | smartphone A |
| ⋮ | ⋮ | ⋮ |

FIG. 12

UNSENT-IMAGE LIST 190b

| FILE ID | SHOOTING TIME | DESTINATION | INDIVIDUAL AUTHENTICATION INFORMATION | FAVORITE FLAG (ON = 1, OFF = 0) |
|---|---|---|---|---|
| P100-0001.jpg | 2017/6/5 10:00 | smartphone A | Mike | 0 |
| P100-0002.jpg | 2017/6/5 10:05 | smartphone A | - | 1 |
| P100-0003.jpg | 2017/6/5 10:10 | smartphone A | - | 0 |
| P100-0004.jpg | 2017/6/5 10:20 | smartphone A | Mike | 0 |
| P100-0005.jpg | 2017/6/5 11:00 | smartphone A | - | 0 |
| ... | ... | ... | ... | ... |

FIG. 13

UNSENT-IMAGE LIST 190c

| FILE ID | SHOOTING TIME | DESTINATION | INDIVIDUAL AUTHENTICATION INFORMATION | FAVORITE FLAG (ON = 1, OFF = 0) |
|---|---|---|---|---|
| P100-0001.jpg | 2017/6/5 10:00 | smartphone A | Mike | 1 |
| P100-0002.jpg | 2017/6/5 10:05 | smartphone A | - | 0 |
| P100-0003.jpg | 2017/6/5 10:10 | smartphone A | Mike | 1 |
| P100-0004.jpg | 2017/6/5 10:20 | smartphone A | - | 0 |
| ⋮ | ⋮ | ⋮ | ⋮ | ⋮ |
| P100-0015.jpg | 2017/6/5 11:00 | smartphone B | - | 0 |
| P100-0016.jpg | 2017/6/5 11:00 | smartphone B | - | 1 |
| ⋮ | ⋮ | ⋮ | ⋮ | ⋮ |

IMAGING DEVICE AND IMAGE TRANSFER METHOD

BACKGROUND

1. Technical Field

The present disclosure relates to an imaging device capable of transferring a captured image to another apparatus.

2. Description of the Related Art

Unexamined Japanese Patent Publication No. 2016-178638 (PTL 1) and Unexamined Japanese Patent Publication No. 2008-53974 (PTL 2) each disclose an imaging device that transmits a shot image to another electronic apparatus. Such an imaging device establishes communication with another electronic apparatus and transmits a shot image to the electronic apparatus with which the communication has been established.

For example, PTL 1 discloses an image capturing device that transmits an image captured by an imaging unit to an external device. This image capturing device includes an automatic transmission processing unit. The automatic transmission processing unit is configured to perform an automatic transmission process, in response to a transmission request, to transmit a shot image to an external device with which communication has been established by a communication unit. The transmission request is a signal output in synchronization with image capture performed by the imaging unit. The image capturing device disclosed in PTL 1 further includes a determination unit. The determination unit, after the automatic transmission process performed by the automatic transmission processing unit, determines whether to interrupt the communication with the external device established by the communication unit based on whether a transmission request different from the above-described transmission request can be issued or not. This configuration allows communication over which a shot image is transmitted to an external apparatus to be suitably controlled.

SUMMARY

In an imaging device capable of transmitting a shot image to another electronic apparatus, in a case where communication with the electronic apparatus is interrupted in a state where transmission of all shot images has not been completed (for example, the imaging device is turned off), an unsent image is left in the imaging device. It is a challenging issue to handle such an unsent image.

The present disclosure provides an imaging device with an automatic image transfer function that is capable of transferring an unsent image to an appropriate communication counterpart.

A first aspect of the present disclosure provides an imaging device. The imaging device includes an imaging unit that images a subject to generate image data, a recording medium that stores the image data, a communication unit that automatically establishes a connection with at least one of a plurality of external apparatuses including a first external apparatus and performs communication with the at least one of the plurality of external apparatuses, and a controller that allows the communication unit to automatically transfer the image data to the at least one of the plurality of external apparatuses. In a case where an unsent piece of the image data is present in the recording medium when the communication unit automatically establishes a new connection with the first external apparatus, when the first external apparatus is identical to an external apparatus having been connected with the communication unit at a time of generation of the unsent piece of the image data, of the plurality of external apparatuses, the controller allows the communication unit to automatically transfer the unsent piece of the image data to the first external apparatus. On the other hand, when the first external apparatus is different from the external apparatus having been connected with the communication unit at the time of generation of the unsent piece of the image data, of the plurality of external apparatuses, the controller forbids the communication unit to automatically transfer the unsent piece of the image data to the first external apparatus.

A second aspect of the present disclosure provides an image transfer method. The image transfer method is an image transfer method for transferring image data from a communication apparatus to at least one of a plurality of external apparatuses including a first external apparatus. The image transfer method includes automatically establishing a connection between the communication apparatus and the at least one of the plurality of external apparatuses. The image transfer method further includes allowing the communication apparatus to automatically transfer the image data to the at least one of the plurality of external apparatuses with a connection between the communication apparatus and the at least one of the plurality of external apparatus automatically established. Furthermore, in a case where the communication apparatus has an unsent piece of the image data when a new connection is automatically established between the communication apparatus and the first external apparatus, the image transfer method includes allowing the communication apparatus to automatically transfer the unsent piece of the image data to the first external apparatus, when the first external apparatus is identical to an external apparatus having been connected with the communication apparatus at a time of generation of the unsent piece of the image data, of the plurality of external apparatuses. On the other hand, the image transfer method includes forbidding the communication apparatus to automatically transfer the unsent piece of the image data to the first external apparatus, when the first external apparatus is different from the external apparatus having been connected with the communication apparatus at the time of generation of the unsent piece of the image data, of the plurality of external apparatuses.

A third aspect of the present disclosure provides an imaging device. The imaging device includes an imaging unit that images a subject to generate image data, a recording medium that stores the image data, a communication unit performing mutual authentication with a plurality of external apparatuses as communication counterparts, the communication unit being configured to automatically establish a connection with one external apparatus that has been authenticated, of the plurality of external apparatuses, and perform communication with the one external apparatus that has been authenticated, and a controller that allows the communication unit to automatically transfer the image data to the one external apparatus that has been authenticated. The controller sets a destination of each piece of the image data.

BRIEF DESCRIPTION OF THE DRAWINGS

FIG. 4 is a diagram illustrating an example of an unsent-image list in the digital camera;

FIG. 12 is a diagram illustrating another configuration example of the unsent-image list; and FIG. 13 is a diagram illustrating still another configuration example of the unsent-image list.

DETAILED DESCRIPTION

Hereinafter, exemplary embodiments will be described in detail with reference to the drawings as appropriate. However, descriptions in more detail than necessary may be omitted. For example, a detailed description of well-known matters and a duplicate description of substantially identical configurations may be omitted. This is intended to prevent the following description from becoming unnecessarily redundant and to facilitate understanding by those skilled in the art. Here, the inventor provides the attached drawings and the following description such that those skilled in the art can sufficiently understand the present disclosure, and therefore, they do not intend to restrict the subject matters of claims.

In an imaging device capable of automatically transferring a shot image to an external apparatus, in a case where communication with the external apparatus is interrupted in a state where transfer of all shot images to the external apparatus has not been completed (for example, the imaging device is turned off), an unsent image is left in the imaging device. In order to improve user convenience, such an unsent image is preferably transmitted to the external apparatus when communication between the imaging device and the external apparatus is subsequently established. However, in a configuration where an image is transmitted to an external apparatus whenever new communication between the imaging device and the external apparatus is established, an image may be transmitted to an external apparatus that is not intended by the user. For example, in a case where an external apparatus having been connected with the imaging device at the time of communication interruption is different from an external apparatus that establishes a first connection with the imaging device after the communication interruption, an unsent image is to be transferred to the currently connected external apparatus that is different from an image transfer destination intended by the user as when the user shots the unsent image.

In light of the above, description will be given below of a configuration of an imaging device capable of transmitting an unsent image to an appropriate external apparatus.

First Exemplary Embodiment

[1-1. Configuration]

Figure 1:
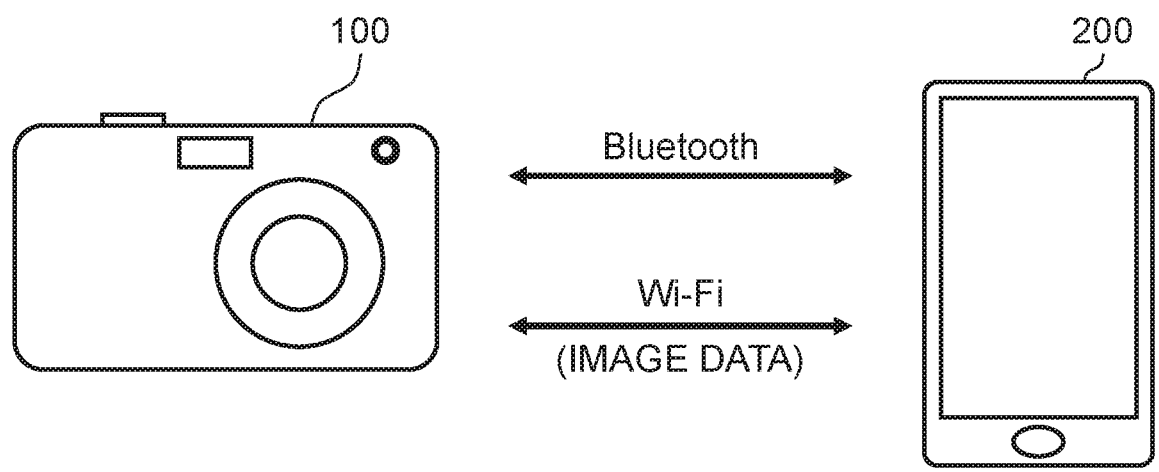
FIG. 1 is a configuration diagram of an imaging system including a digital camera and a smartphone.

FIG. 1 is a diagram illustrating a configuration of an imaging system according to a first exemplary embodiment of the present disclosure. The imaging system includes digital camera 100 and smartphone 200. Digital camera 100 is one example of an imaging device and a communication apparatus according to the present disclosure. Smartphone 200 is one example of an external apparatus according to the present disclosure.

Digital camera 100 has an automatic image transfer function of automatically transferring a shot image to the external apparatus. A user is allowed to enable or disable the automatic image transfer function. With the automatic image transfer function enabled, digital camera 100 automatically transfers image data of a shot image to smartphone 200 for each shooting of an image.

[1-1-1. Configuration of Digital Camera]

Figure 2:
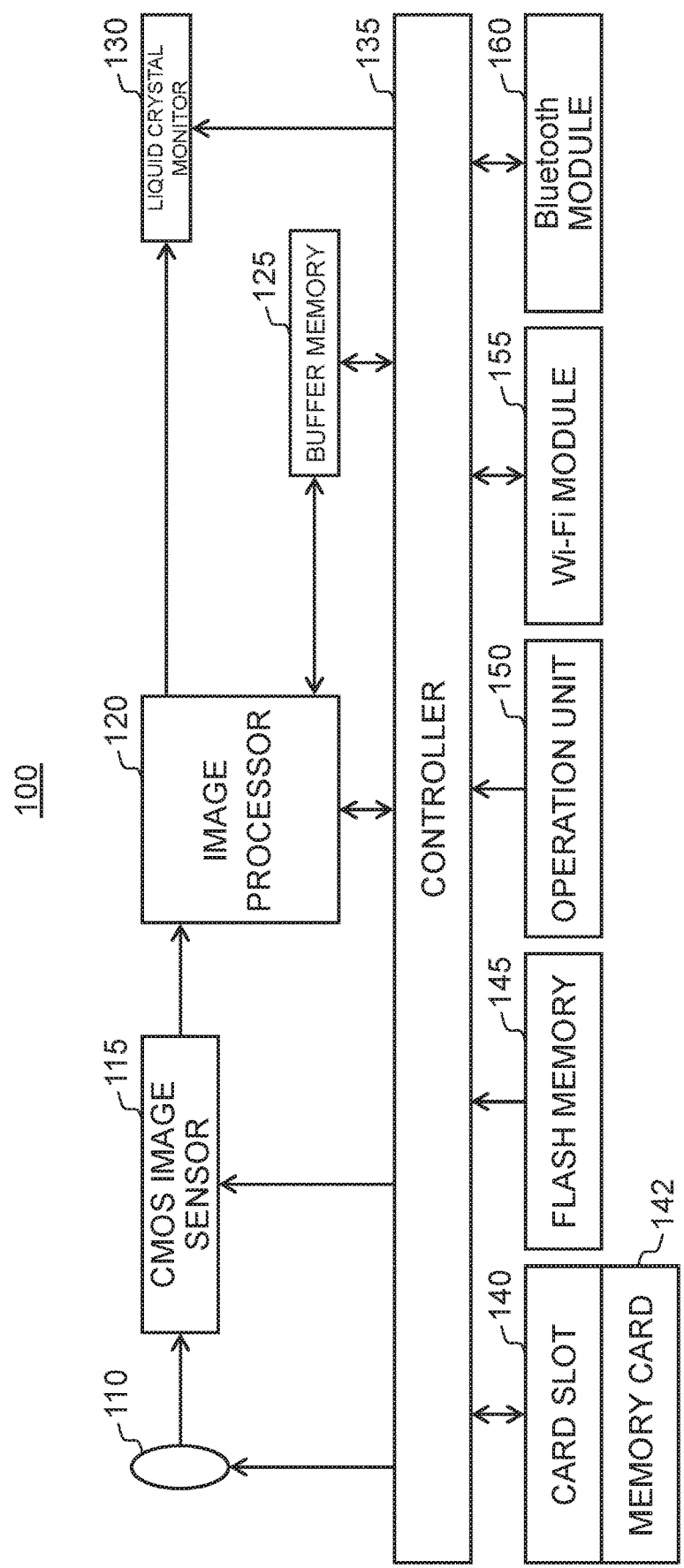
FIG. 2 is an electrical configuration diagram of the digital camera.

FIG. 2 is an electrical configuration diagram of digital camera 100. In digital camera 100, complementary metal oxide semiconductor (CMOS) image sensor 115 captures a subject image formed by optical system 110. CMOS image sensor 115 generates captured-image data (that is, raw data) based on the subject image captured. Image processor 120 performs various types of processing on the captured-image data generated through capturing to generate image data. Controller 135 records the image data generated by image processor 120 in memory card 142 loaded in card slot 140. Furthermore, controller 135 can display (that is, play back) the image data recorded in memory card 142 on liquid crystal monitor 130 in accordance with an operation on operation unit 150 performed by a user.

Optical system 110 includes a focusing lens, a zoom lens, an optical image stabilizer (OIS) lens, a diaphragm, a shutter, and the like. Optical system 110 may include any number of various lenses. Furthermore, one or more lens groups may constitute optical system 110. Each lens group includes one or more lenses.

CMOS image sensor 115 captures a subject image formed by optical system 110 to generate captured-image data. CMOS image sensor 115 generates image data of a new frame at a predetermined frame rate (for example, 30 frames per second). Controller 135 controls a generation timing of captured-image data and an electronic shutter operation for CMOS image sensor 115. Note that the image sensor is not limited to the CMOS image sensor, and a different type of image sensor may be used, such as a charge coupled device (CCD) image sensor or an n-channel metal-oxide semiconductor (NMOS) image sensor.

Image processor 120 performs various types of processing on the captured-image data output from CMOS image sensor 115 to generate image data. Furthermore, image processor 120 performs the various types of processing on the image data read from memory card 142 to generate an image to be displayed on liquid crystal monitor 130. The various types of processing include, for example, at least one of white balance correction, gamma correction, YC conversion, electronic zoom, compression, and decompression; however, the various types of processing are not limited to such processing. Image processor 120 may be configured with a hard-wired electronic circuit, a microcomputer using a program, or the like.

Liquid crystal monitor 130 is provided on a back of digital camera 100. Liquid crystal monitor 130 displays an image based on the image data processed by image processor 120. Note that, instead of such a liquid crystal monitor, another monitor such as an organic electro-luminescence (EL) monitor may be used.

Controller 135 includes a central processing unit (CPU) and performs centralized control on entire operation of digital camera 100. Alternatively, controller 135 may be integrally configured with image processor 120 and the like in a single semiconductor chip. Although not illustrated in the drawings, controller 135 includes a read only memory (ROM). The ROM stores, for example, a service set identifier (SSID) and a wired equivalent privacy (WEP) key necessary for establishing Wi-Fi (registered trademark) communication with another communication apparatus. Controller 135 can read the SSID and the WEP key from the ROM as necessary. The ROM further stores a program to be executed by the CPU. The program to be stored includes a program for centralized control on entire operation of digital camera 100 in addition to a program for automatic focus control (AF control), a program for communication control, and the like. For example, the ROM stores an image transfer application. The image transfer application is a program for transferring an image shot with digital camera 100 to an external apparatus (for example, smartphone 200). Controller 135 further includes a random access memory (RAM). The RAM serves as a work area of the CPU.

Buffer memory 125 is a recording medium serving as a working memory of image processor 120 and controller 135. Buffer memory 125 is implemented by, for example, a dynamic random access memory (DRAM).

Card slot 140 is a part into which memory card 142 that is removable is inserted. Card slot 140 can mechanically and electrically connect memory card 142 with digital camera 100. Memory card 142 is an external memory including a recording element such as a flash memory. Memory card 142 can store data such as image data generated by image processor 120.

Flash memory 145 is a non-volatile recording medium. Flash memory 145 stores an unsent-image list used for managing unsent images. Details of the unsent-image list will be described below.

Operation unit 150 is a generic term of a hard key including at least one of an operation button, an operation lever, a dial, and a touch panel provided on the exterior of digital camera 100. Operation unit 150 receives an operation performed by the user. Upon receipt of the user's operation, operation unit 150 transmits, to controller 135, an operation signal corresponding to the user's operation.

Wi-Fi module 155 is a communication module that performs communication in compliance with the communication standard IEEE 802.11 or the Wi-Fi standard. In the present exemplary embodiment, the communication module corresponding to Wi-Fi module 155 is a circuit. Digital camera 100 can communicate, via Wi-Fi module 155, with another apparatus equipped with a Wi-Fi module. Digital camera 100 may communicate, via Wi-Fi module 155, with another apparatus either directly or via an access point. Note that, instead of such a Wi-Fi module, a communication module that performs communication in compliance with another communication standard may be used. That is, as the communication module, any communication module capable of performing communication in a range of several meters or more at a relatively high communication bit rate may be used.

Bluetooth (registered trademark) module 160 is a module that performs communication in compliance with the communication standard 802.15.1, that is, the Bluetooth (registered trademark) standard. In the present exemplary embodiment, the communication module corresponding to Bluetooth module 160 is a circuit. Digital camera 100 can communicate, via Bluetooth module 160, with another apparatus in compliance with the Bluetooth standard. Digital camera 100 may be provided with a near field communication (NFC) reader and writer instead of the Bluetooth module and communicate with another apparatus in accordance with the NFC standard. Alternatively, instead of the Bluetooth module, any communication module capable of performing a different type of near-field radio communication may be used.

[1-1-2. Configuration of Smartphone]

Figure 3:
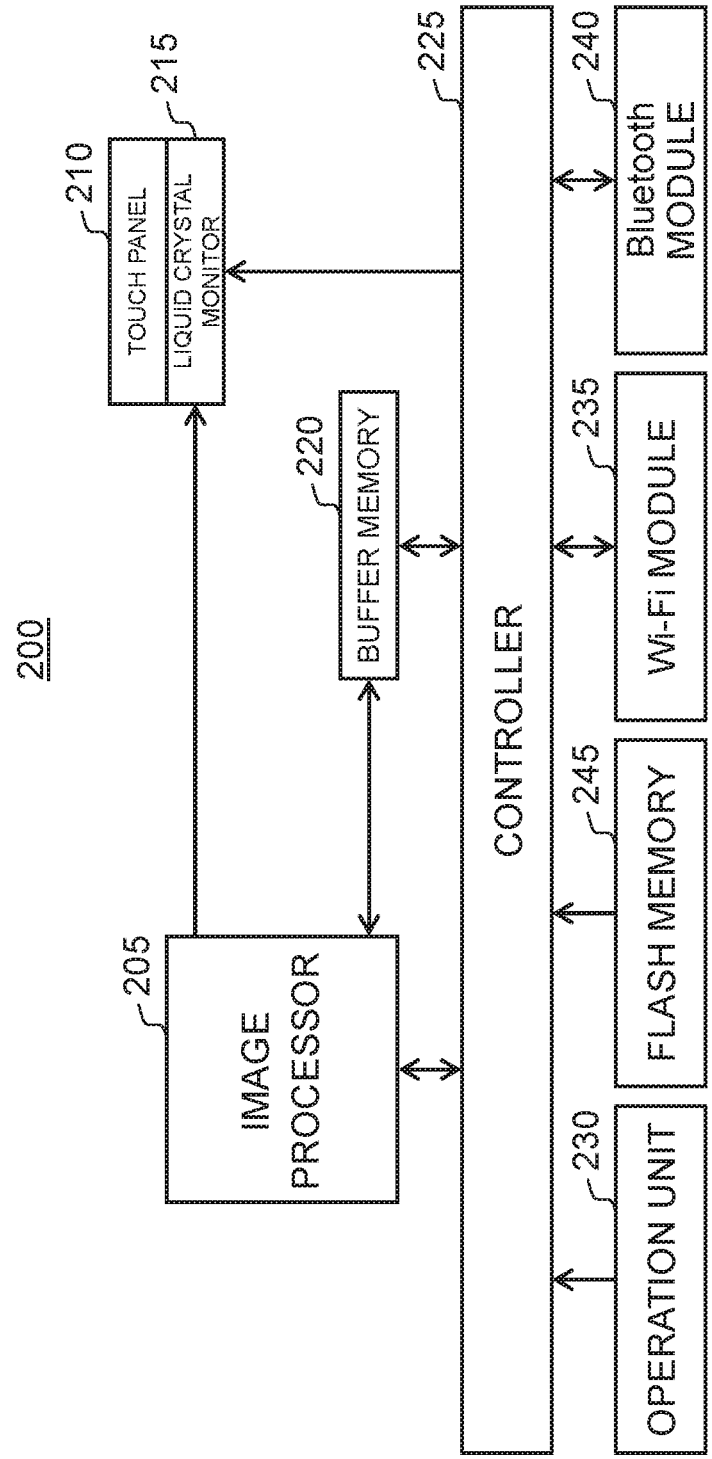
FIG. 3 is an electrical configuration diagram of the smartphone.

FIG. 3 is an electrical configuration diagram of smartphone 200. Smartphone 200 can display, on liquid crystal monitor 215, an image corresponding to image data generated by image processor 205. Touch panel 210 is disposed on a surface of liquid crystal monitor 215, which allows smartphone 200 to receive a touch operation performed by a user. Smartphone 200 further includes operation unit 230, which allows the user to use operation unit 230 to perform operations other than operations performed on touch panel 210. Controller 225 can communicate with another apparatus via Wi-Fi module 235 and Bluetooth module 240.

Image processor 205 performs various types of processing on image data read from flash memory 245 to generate an image to be displayed on liquid crystal monitor 215. The various types of processing include decompression and the like; however, the various types of processing are not limited to those described above. Image processor 205 may be configured with a hard-wired electronic circuit, a microcomputer using a program, or the like.

Touch panel 210 is an input device that detects contact made by, for example, a finger of the user and outputs operation information to controller 225. Touch panel 210 is disposed on the surface of liquid crystal monitor 215. Touch panel 210 may be any one of a resistive touch panel, a capacitive touch panel, and a touch panel of any other type.

Liquid crystal monitor 215 is a display device that displays a screen designated by controller 225. Instead of such a liquid crystal monitor, an organic EL monitor may be used.

Buffer memory 220 is a memory that temporarily stores information necessary for controller 225 to execute various tasks.

Controller 225 controls operation of each of the units configuring smartphone 200. Controller 225 is electrically connected to image processor 205, touch panel 210, liquid crystal monitor 215, buffer memory 220, operation unit 230, Wi-Fi module 235, and Bluetooth module 240.

Wi-Fi module 235 is a communication module that performs communication in compliance with the communication standard IEEE 802.11. Smartphone 200 can communicate, via Wi-Fi module 235, with another apparatus equipped with a Wi-Fi module. Smartphone 200 may communicate, via Wi-Fi module 235, with another apparatus either directly or via an access point.

Bluetooth module 240 is a module (for example, a circuit) that performs communication in compliance with the communication standard 802.15.1, that is, the Bluetooth standard. Smartphone 200 can communicate, via Bluetooth module 240, with another apparatus in compliance with the Bluetooth standard. Smartphone 200 may be provided with an NFC reader and writer instead of the Bluetooth module and communicate with another apparatus in accordance with the NFC standard. Alternatively, instead of the Bluetooth module, any communication module capable of performing a different type of near-field radio communication may be used.

Flash memory 245 stores, for example, image data shot with smartphone 200 and image data transferred from digital camera 100.

Note that smartphone 200 may further include, for example, a phone function, an Internet communication function, and a camera function.

[1-1-3. Unsent-Image List]

FIG. 4 is a diagram illustrating an example of the unsent-image list stored in flash memory 145 of digital camera 100. Unsent-image list 190 is information used, by digital camera 100 with the automatic image transfer function enabled, for managing images that have not yet been transmitted to smartphone 200. This information can be represented in the form of a table. When digital camera 100 with the automatic image transfer function enabled is turned off, for example, communication between digital camera 100 and smartphone 200 may be interrupted in a state where one or some of the images shot with digital camera 100 have not been transferred to smartphone 200. In such a case, unsent-image list 190 is used for managing images that have not yet been transferred to smartphone 200. Unsent-image list 190 is used for managing various types of information on unsent images.

To be more specific, as illustrated in FIG. 4, unsent-image list 190 is used for managing "FILE ID", "SHOOTING TIME", and "DESTINATION" of each unsent image, as the various types of information.

"FILE ID" corresponds to information used for identifying an unsent image. Herein, a file name of an unsent image is used as "FILE ID". "SHOOTING TIME" corresponds to information indicating date and time at which the unsent image is shot.

"DESTINATION" corresponds to information indicating an apparatus to which the unsent image is transmitted. To be more specific, "DESTINATION" corresponds to information on an apparatus to which an image is transferred, namely, a device name of the apparatus (for example, smartphone 200) that has Bluetooth communication established with digital camera 100.

[1-2. Operation]

Operations of digital camera 100 and smartphone 200 will be described below.

In a case where digital camera 100 and smartphone 200 are located within a range where Bluetooth communication is possible, digital camera 100 and smartphone 200 automatically establish a connection with each other, thereby establishing the Bluetooth communication. Subsequently, Wi-Fi communication is established between digital camera 100 and smartphone 200. With the automatic image transfer function enabled, digital camera 100 transmits image data of a shot image to smartphone 200 over the Wi-Fi communication for each shooting of an image. Smartphone 200 receives the image data of the shot image from digital camera 100 over the Wi-Fi communication and records the image data into flash memory 245.

[1-2-1. Pairing]

In order to establish the Bluetooth communication between digital camera 100 and smartphone 200, paring needs to be performed first in accordance with the Bluetooth standard. Herein, the paring corresponds to a process in which apparatuses authenticate each other as communication counterparts in order to avoid communication with an unrelated apparatus. Once the pairing is completed, both the apparatuses that have been paired with each other register information on the respective communication counterparts. When detecting, within a range where the Bluetooth communication is possible, an external apparatus previously paired with digital camera 100, digital camera 100 automatically establishes a connection with the external apparatus. When detecting, within the range where the Bluetooth communication is possible, a plurality of external apparatuses previously paired with digital camera 100, digital camera 100 automatically establishes a connection with one of the plurality of external apparatuses.

Figure 5:
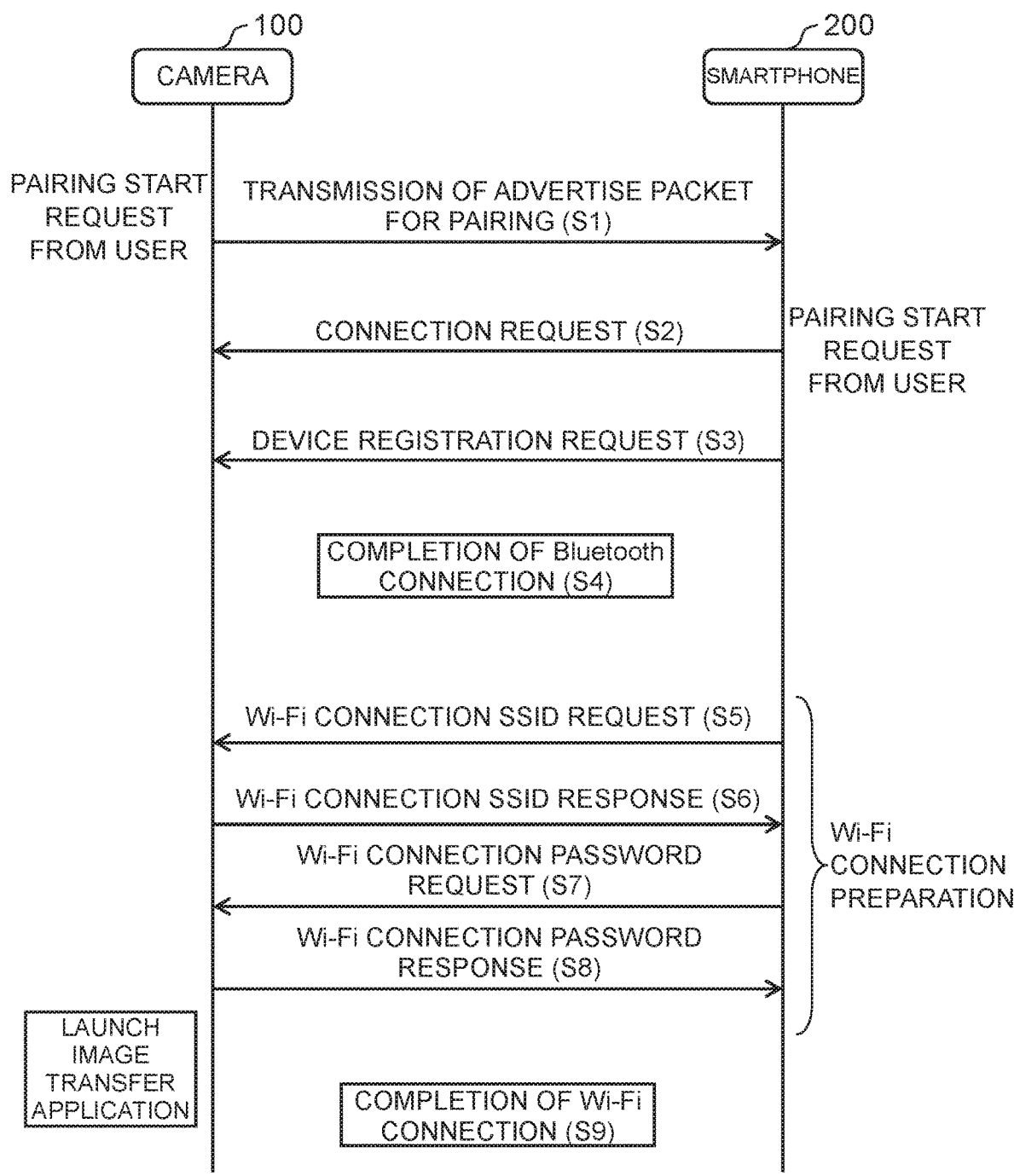
FIG. 5 is a sequence diagram of a pairing operation and a Wi-Fi (registered trademark) connection operation between the digital camera and the smartphone.

A pairing operation between digital camera 100 and smartphone 200 will be described with reference to FIG. 5. FIG. 5 is a sequence diagram of the pairing operation and a subsequent Wi-Fi connection operation between digital camera 100 and smartphone 200.

Figure 6:
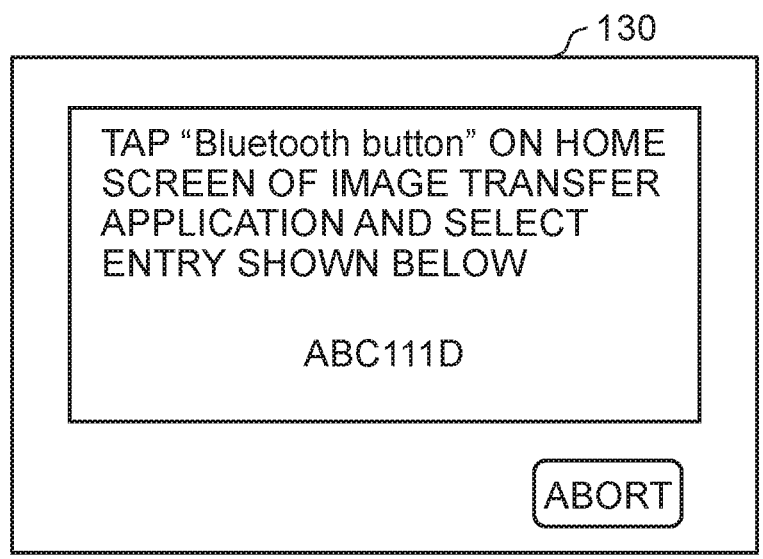
FIG. 6 is a diagram illustrating a display example, on a liquid crystal monitor of the digital camera, of a message that is displayed during pairing.

When the user uses operation unit 150 to instruct digital camera 100 to initiate pairing with smartphone 200 that has not been paired with digital camera 100, digital camera 100 transmits (that is, broadcasts) an Advertise packet for pairing via Bluetooth module 160 (S1). At this time, on liquid crystal monitor 130 of digital camera 100, such a screen as is illustrated in FIG. 6 is displayed. On the screen in FIG. 6, a device name of digital camera 100 is denoted as "ABC111D". With reference to this screen, the user can notice that the user may select, as a connection destination, a device corresponding to "ABC111D" on an apparatus to be paired with digital camera 100.

Smartphone 200 can recognize, by receiving the Advertise packet, that an apparatus with which a Bluetooth connection can be established is present around smartphone 200. Smartphone 200 displays, on liquid crystal monitor 215, a list of apparatuses with which the Bluetooth connection can be established. When the user selects one of the apparatuses in the list (for example, the device name "ABC111D"), smartphone 200 transmits a connection request to digital camera 100 via Bluetooth module 240 (S2). Next, smartphone 200 registers digital camera 100 as an apparatus to be paired with smartphone 200, and transmits a registration request to digital camera 100 via Bluetooth module 240 (S3). In response to this registration request, digital camera 100 registers smartphone 200 as an apparatus to be paired with digital camera 100. Then, the pairing is completed, and the Bluetooth communication is established (S4). Note that digital camera 100 according to the present exemplary embodiment is capable of paring with a plurality of external apparatuses. However, digital camera 100 is connected to only one external apparatus at a time.

After establishment of the Bluetooth communication (S4), the Wi-Fi communication between digital camera 100 and smartphone 200 is established. To be more specific, smartphone 200 requests digital camera 100 to transmit a service set identifier (SSID) for Wi-Fi connection (S5). In response to this request, digital camera 100 transmits its own SSID to smartphone 200 (SG).

Next, smartphone 200 requests digital camera 100 to transmit a password for the Wi-Fi connection (S7). In response to this request, digital camera 100 transmits the password to smartphone 200 (S8). Smartphone 200 stores the SSID and the password received from digital camera 100 into flash memory 245.

The requests and responses for the SSID and the password for the Wi-Fi connection between digital camera 100 and smartphone 200 (S5 to S8) are made over the Bluetooth communication.

Subsequently, the image transfer application is launched in digital camera 100, and then the Wi-Fi connection is completed (S9). Note that smartphone 200 uses the SSID and the password received from digital camera 100 to establish the Wi-Fi connection with digital camera 100.

As described above, after the pairing operation, the Wi-Fi connection operation is performed. Note that once digital camera 100 and smartphone 200 have been paired with each other, no more pairing is required between digital camera 100 and smartphone 200.

[1-2-2. Automatic Image Transfer]

When digital camera 100 is turned on and smartphone 200 (external apparatus) is present near digital camera 100, digital camera 100 establish respective connections for the Bluetooth and Wi-Fi communication with the external apparatus. At this time, in a case where smartphone 200 present near digital camera 100 has not yet been paired with digital camera 100, digital camera 100 performs the paring with smartphone 200 in accordance with the procedure illustrated in FIG. 5 and then establishes the Bluetooth connection and the Wi-Fi connection. In a case where smartphone 200 present near digital camera 100 has been paired with digital camera 100, digital camera 100 uses information on the pairing to establish, with smartphone 200, the Bluetooth connection and then the Wi-Fi connection. In a case where digital camera 100 that has established the connections with smartphone 200 has the automatic image transfer function enabled, digital camera 100 automatically transmits image data of a shot image to smartphone 200 for each shooting of an image.

Figure 7:
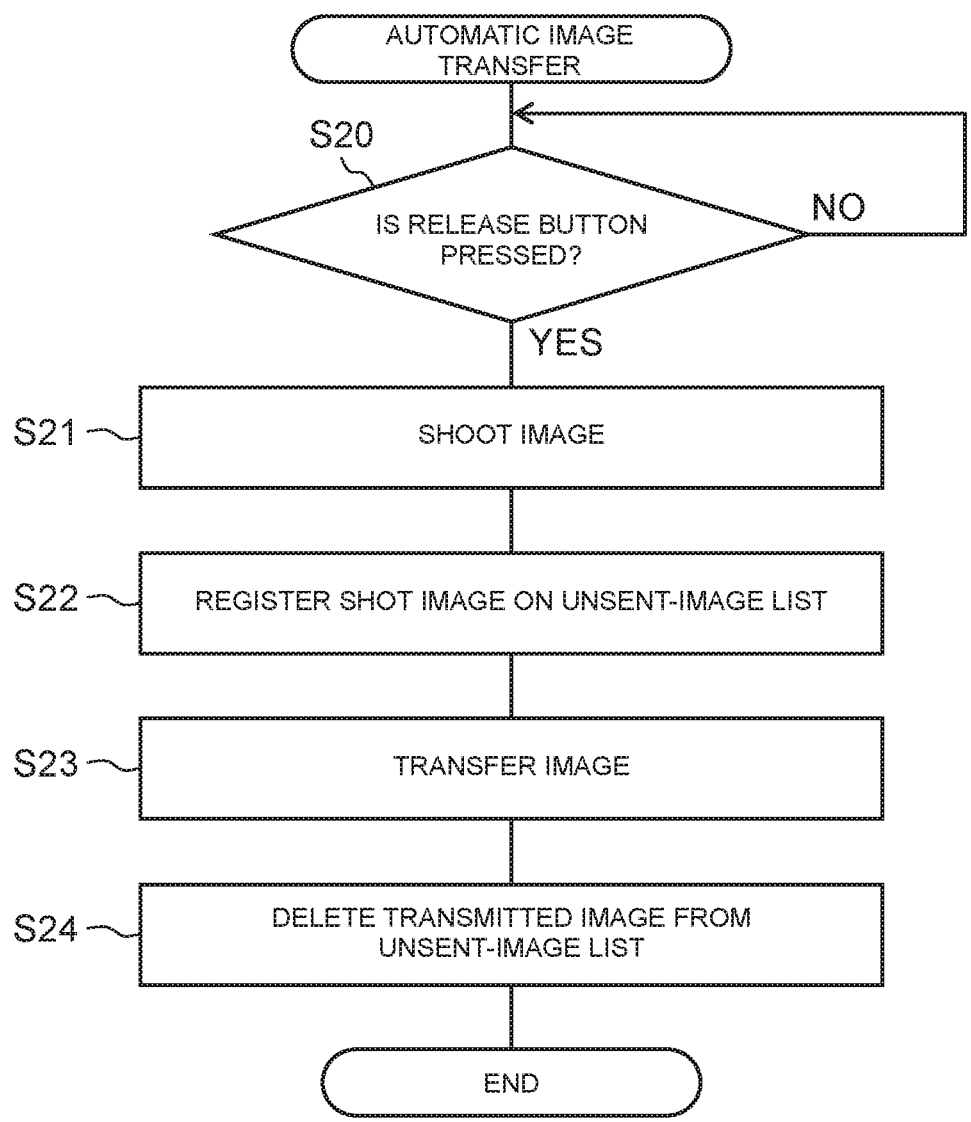
FIG. 7 is a flowchart of an automatic image transfer operation of the digital camera.

FIG. 7 is a flowchart of an automatic image transfer operation of digital camera 100. The automatic image transfer operation of digital camera 100 will be described with reference to FIG. 7. Note that, in the following description, it is assumed that digital camera 100 has already established the Bluetooth connection and the Wi-Fi connection with smartphone 200 and has the automatic image transfer function enabled. When digital camera 100 establishes the Bluetooth connection with smartphone 200, digital camera 100 acquires information on smartphone 200 that has connected with digital camera 100. The information on smartphone 200 includes, for example, a device ID.

With the automatic image transfer function enabled, when the user operates a release button of digital camera 100 (YES in S20), digital camera 100 initiates a shooting operation (S21). This causes CMOS image sensor 115 to capture a subject image formed by optical system 110 to generate image data.

Controller 135 adds an entry corresponding to the image data captured by CMOS image sensor 115 to unsent-image list 190 (S22). To be more specific, controller 135 registers a file ID (file name), a shooting time, and a destination of the captured image into unsent-image list 190. In a "DESTINATION" field, information used for identifying an external apparatus (a smartphone in this example) that currently has the Bluetooth connection with digital camera 100 is recorded. At this time, unsent-image list 190 is stored in the RAM serving as a work area.

Subsequently, controller 135 transmits image data of the image registered in unsent-image list 190 to smartphone 200 (S23). At this time, digital camera 100 exchanges a command and a response with smartphone 200 over the Bluetooth connection. On the other hand, the image data is transmitted over the Wi-Fi connection that has a higher data transfer rate than the Bluetooth connection has.

When the image has been transmitted to smartphone 200, controller 135 deletes, from unsent-image list 190, the entry corresponding to the image transmitted (S24). As described above, unsent-image list 190 is updated, which causes only images that have not yet been transmitted to smartphone 200 to be managed normally in unsent-image list 190.

[1-2-3. Saving of Unsent-Image List]

Figure 8:
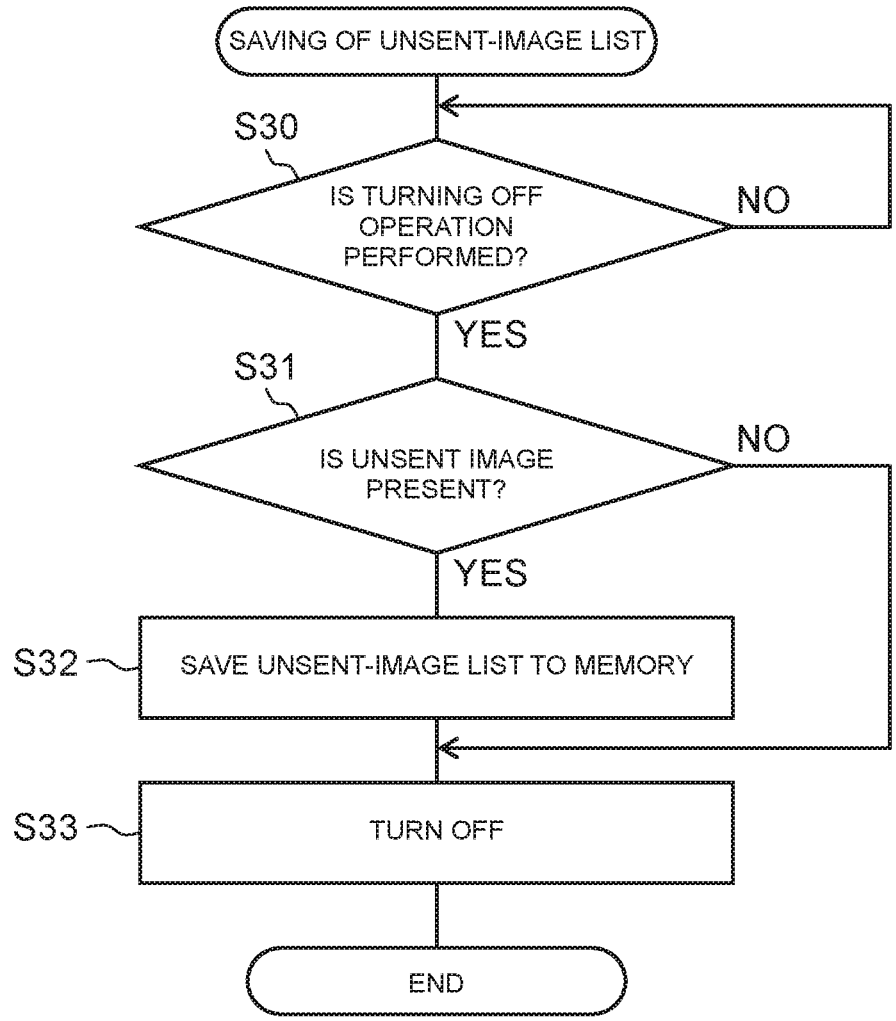
FIG. 8 is a flowchart of an unsent-image list save operation of the digital camera.

When digital camera 100 is turned off by the user, digital camera 100 saves unsent-image list 190 to flash memory 145 that is non-volatile in a case where any unsent image is present in digital camera 100. FIG. 8 is a flowchart of an operation for saving unsent-image list 190 when digital camera 100 is turned off.

When controller 135 of digital camera 100 receives a turning-off operation performed by the user via operation unit 150 (S30), controller 135 checks unsent-image list 190 for any unsent image (S31). In a case where no unsent image is present (NO in S31), controller 135 turns digital camera 100 off (S33). That is, controller 135 stops supply of power to each of the components of digital camera 100. On the other hand, in a case where an unsent image is present (YES in S31), controller 135 saves unsent-image list 190 to flash memory 145 (S32). Subsequently, controller 135 turns digital camera 100 off (S33).

Such a configuration in which unsent-image list 190 is saved when digital camera 100 is turned off makes it possible to identify an unsent image by reference to unsent-image list 190 when digital camera 100 is turned on (that is, started) next.

Figure 9:
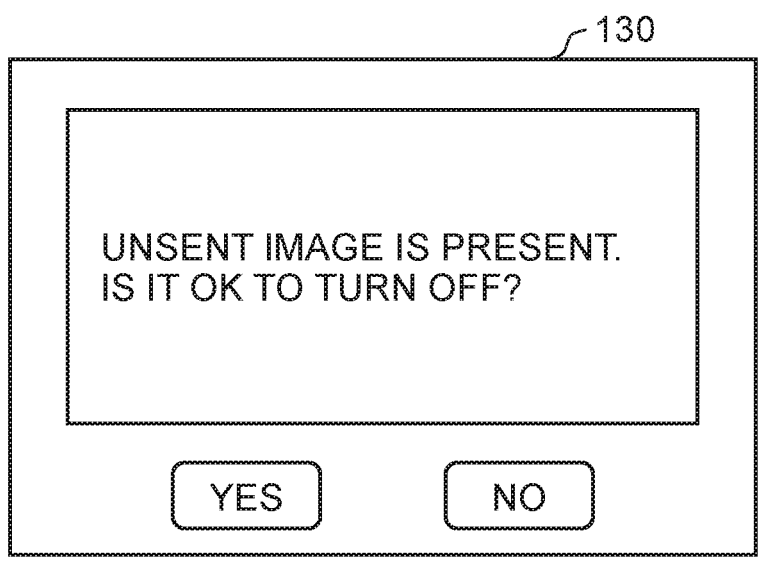
FIG. 9 is a diagram illustrating a display example, on the liquid crystal monitor of the digital camera, of a message that prompts a user to determine whether to abort image transfer.

Note that when the turning-off operation is performed on digital camera 100 having an unsent image, such a confirmation message as is illustrated in FIG. 9 may be displayed on liquid crystal monitor 130 for the user. When the user selects "YES" for this message, digital camera 100 is turned off. When the user selects "NO", the turning-off operation may be canceled. Such a message display allows the user to notice that an unsent image will be left after digital camera 100 is turned off, which in turn allows the user to determine whether it is really appropriate to turn off digital camera 100.

[1-2-4. Transfer of Unsent Image]

When digital camera 100 is turned on, digital camera 100 automatically establishes a connection with a smartphone (one example of the external apparatus) previously paired with digital camera 100. At this time, in a case where digital camera 100 has an unsent image intended for previous automatic image transfer to the smartphone with which digital camera 100 has automatically established the connection, digital camera 100 automatically transfers the unsent image to the smartphone.

Figure 10:
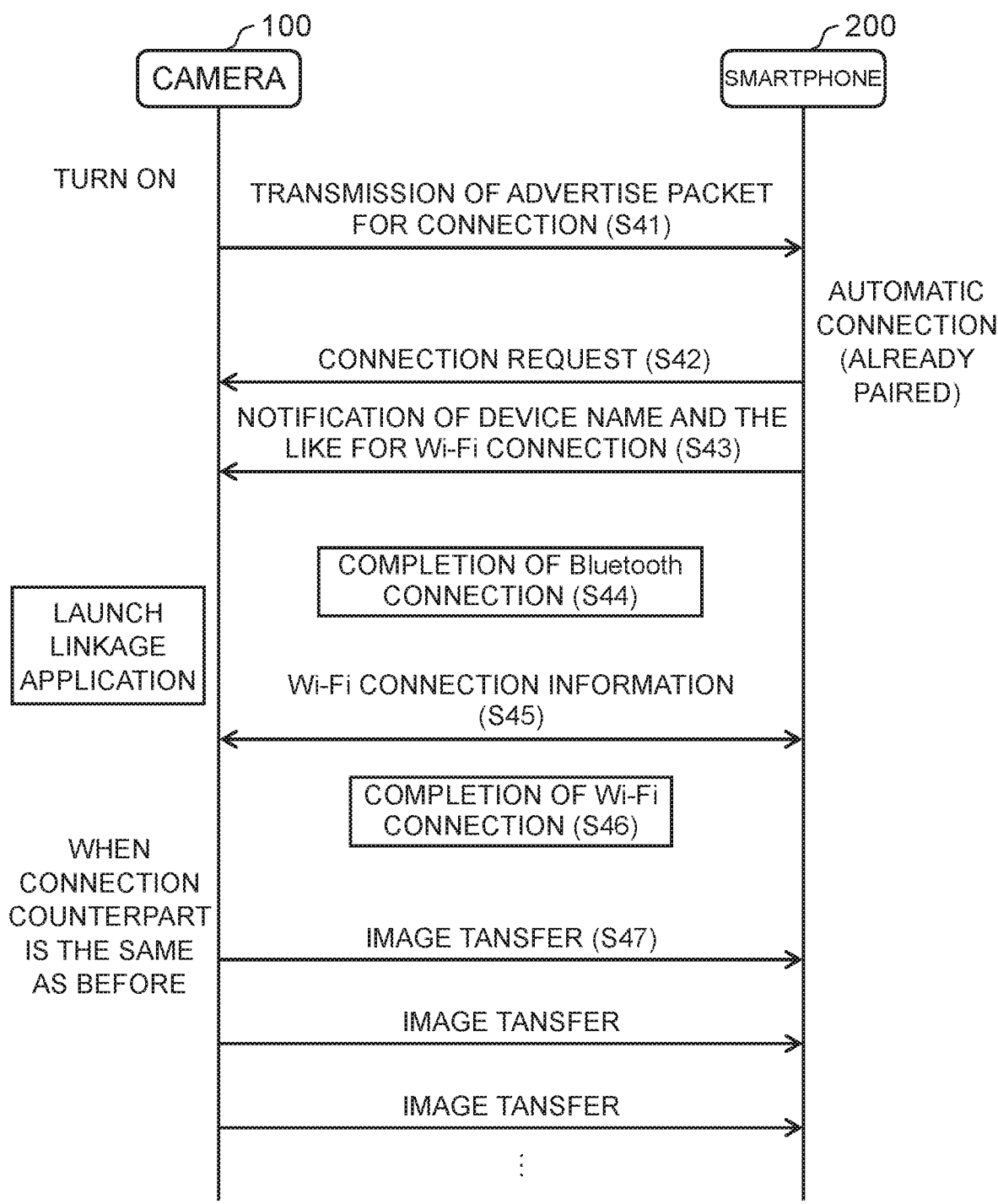
FIG. 10 is a sequence diagram of an operation for automatically transferring an unsent image between the digital camera and the smartphone.

An operation for automatically transferring an unsent image when digital camera 100 is turned on will be described below with reference to FIG. 10. FIG. 10 is a sequence diagram of the operation for automatically transferring the unsent image between digital camera 100 and smartphone 200.

When digital camera 100 is turned on, digital camera 100 broadcasts an Advertise packet in accordance with the Bluetooth standard (S41). Digital camera 100 and smartphone 200 have been already paired with each other; thus, when smartphone 200 receives the Advertise packet from digital camera 100, smartphone 200 automatically transmits a connection request to digital camera 100 in accordance with the Bluetooth standard and informs digital camera 100 of a device name and the like for the Wi-Fi connection (S42, S43). This causes the Bluetooth communication to be established between digital camera 100 and smartphone 200 (S44). Then, digital camera 100 recognizes smartphone 200 as a destination to which digital camera 100 transfers an image.

Subsequently, in digital camera 100, the image transfer application is launched. Next, a process for establishing the Wi-Fi connection between digital camera 100 and smartphone 200 is performed (S45), and the Wi-Fi communication is established (S46). Smartphone 200 has already stored, therein, the SSID and the password of digital camera 100 that are acquired in the first connection with digital camera 100, and uses the SSID and the password to establish the Wi-Fi communication.

As described above, at the time when digital camera 100 is turned on, digital camera 100 and smartphone 200 automatically establish the connection with each other using the Bluetooth communication and the Wi-Fi communication.

In a case where smartphone 200 currently connected with digital camera 100 is identical to an apparatus having been connected with digital camera 100 at the time of shooting of an unsent image, digital camera 100 transmits the unsent image to smartphone 200 currently connected with digital camera 100 (S47). On the other hand, in a case where smartphone 200 currently connected with digital camera 100 is different from the apparatus having been connected with digital camera 100 at the time of shooting of the unsent image, digital camera 100 is forbidden to transfer the unsent image to smartphone 200 currently connected digital camera 100 (these processes will be described in detail below). Note that in a case where no unsent image is present in the previous startup of digital camera 100, the same process up to Wi-Fi communication establishment as is illustrated in FIG. 10 is performed. Subsequently, digital camera 100 transfers an image without determination whether smartphone 200 currently connected with digital camera 100 is identical to an apparatus previously having been connected with digital camera 100.

As described above, in a case where digital camera 100 according to the present exemplary embodiment has an unsent image when being turned on, only when an apparatus identical to a smartphone (one example of the external apparatus) having been connected with digital camera 100 at the time of shooting of the unsent image is currently connected with digital camera 100, digital camera 100 automatically transfers the unsent image. This can prevent a shot image from being automatically transferred to an apparatus not intended for a destination by the user at the time of shooting of the image.

Figure 11:
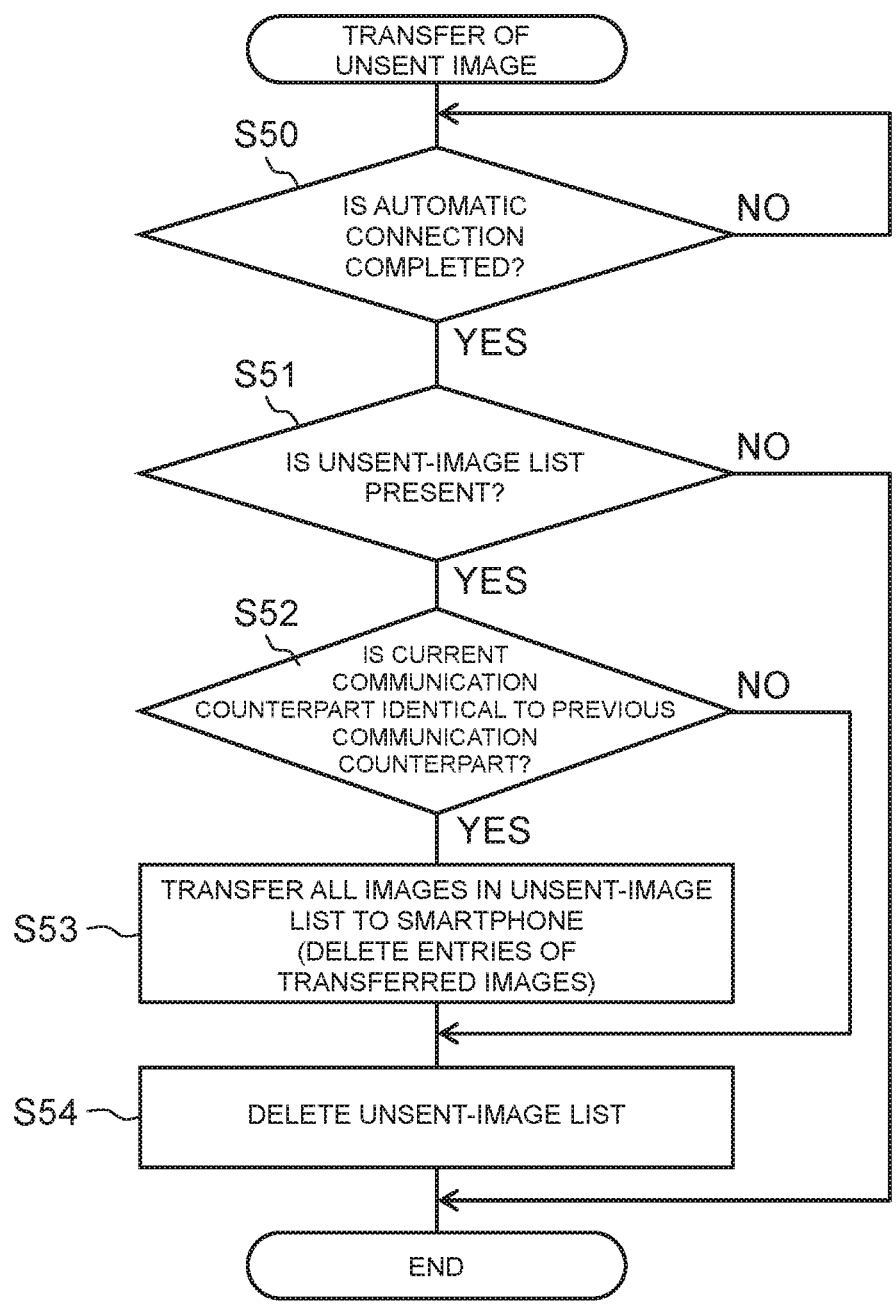
FIG. 11 is a flowchart of an operation of the digital camera for automatically transferring an unsent image.

Such an operation of digital camera 100 for transferring an unsent image will be described in detail with reference to FIG. 11. FIG. 11 is a flowchart of the operation of digital camera 100 for automatically transferring the unsent image that is performed when digital camera 100 is turned on (that is, started).

When digital camera 100 is turned on and completes the automatic connection with smartphone 200 (YES in S50), controller 135 determines whether unsent-image list 190 is saved in flash memory 145 (S51). In a case where unsent-image list 190 is not saved in flash memory 145 (NO in S51), the process is terminated since no unsent-image list 190 is present.

In a case where unsent-image list 190 is saved in flash memory 145, determination is made that an unsent image is present. In a case where unsent-image list 190 is saved in flash memory 145 (YES in S51), controller 135 determines whether smartphone 200 (one example of the external apparatus) that currently has the Bluetooth connection with digital camera 100 is identical to an apparatus having been connected with digital camera 100 at the time of shooting the unsent image (S52). An external apparatus having been connected with digital camera 100 at the time of shooting of the unsent image can be recognized with reference to "DESTINATION" in unsent-image list 190.

In a case where smartphone 200 that currently has the Bluetooth connection with digital camera 100 is identical to the apparatus having been connected with digital camera 100 at the time of shooting of the unsent image (YES in S52), controller 135 transfers the unsent image registered in unsent-image list 190 to smartphone 200 that currently has the Bluetooth connection with digital camera 100 (S53). At this time, a plurality of images registered in unsent-image list 190 are transferred, one by one, to smartphone 200 that currently has a connection with digital camera 100. Once the transfer is completed, entries corresponding to the images that have been transferred are deleted from unsent-image list 190 (S53).

On the other hand, in a case where smartphone 200 that currently has the Bluetooth connection with digital camera 100 is different from the apparatus having been connected with digital camera 100 at the time of shooting of the unsent image (NO in S52), controller 135 does not transfer the unsent image registered in the unsent-image list 190.

For example, in a case where digital camera 100 has unsent-image list 190 as illustrated in FIG. 4 at the time when being turned on, when a smartphone whose device name is "smartphone A" establishes a connection with digital camera 100, an image registered in unsent-image list 190 is automatically transferred to the smartphone. However, in a case where a smartphone whose device name is "smartphone B" automatically establishes a connection with digital camera 100, an image registered in unsent-image list 190 is not automatically transferred.

Subsequently, controller 135 deletes unsent-image list 190 from flash memory 145 (S54), and then the process ends.

[1-3. Effects and Other Remarks]

As described above, digital camera 100 (one example of the imaging device) according to the present exemplary embodiment includes CMOS image sensor 115 (one example of the imaging unit), memory card 142 (one example of the recording medium), Bluetooth module 160 and Wi-Fi module 155 (examples of the communication unit), and controller 135 (one example of the controller). CMOS image sensor 115 captures a subject image to generate image data. Memory card 142 stores the image data generated by CMOS image sensor 115. Bluetooth module 160 and Wi-Fi module 155 automatically establish respective connections with at least one of a plurality of external apparatuses including smartphone 200 (one example of the first external apparatus) and perform communication with the at least one of the plurality of external apparatuses. Controller 135 automatically transfers the image data generated by CMOS image sensor 115 to the at least one of the plurality of external apparatuses (for example, smartphone 200).

In a case where an unsent image data is present in memory card 142 when Bluetooth module 160 and Wi-Fi module 155 automatically establish new connections with smartphone 200, when smartphone 200 that has the new connections is identical to an apparatus having been connected with Bluetooth module 160 at the time of shooting of the unsent image data, controller 135 allows Wi-Fi module 155 to automatically transfer the unsent image data to smartphone 200 that has the new connections. On the other hand, when smartphone 200 that has the new connections is different from the apparatus having been connected with Bluetooth module 160 at the time of shooting of the unsent image, controller 135 forbids Wi-Fi module 155 to automatically transfer the unsent image data to smartphone 200 that has the new connections.

Such control can prevent the unsent image from being transmitted to an apparatus that is different from a smartphone (one example of the external apparatus) having been connected with digital camera 100 at the time of shooting of the unsent image.

Furthermore, digital camera 100 may further store unsent-image list 190 used for managing unsent image data as one example of the management information. Controller 135 checks unsent-image list 190 to identify image data to be transmitted. As described above, controller 135 can check unsent-image list 190 to identify image data to be transmitted to smartphone 200.

Controller 135 may automatically transfer, to an external apparatus, only a piece of unsent image data that meets a predetermined condition.

Herein, the predetermined condition may include, for example, at least one of a condition where the piece of the image data is selected by the user, a condition where the piece of the image data contains data of a predetermined object, a condition where the piece of the image data is shot in a predetermined shooting mode, and a condition where a predetermined time has not passed since shooting of the piece of the image data.

The exemplary embodiment further discloses an image transfer method for transferring image data from digital camera 100 (one example of the communication apparatus) to at least one of a plurality of external apparatuses including smartphone 200 (one example of the first external apparatus). In the image transfer method, a connection between digital camera 100 and smartphone 200 is automatically established. With the connection between digital camera 100 and smartphone 200 established, digital camera 100 automatically transfers image data generated to smartphone 200. At this time, in a case where digital camera 100 has unsent image data when smartphone 200 automatically establishes a new connection with digital camera 100, when smartphone 200 that has the new connection is identical to an apparatus having been connected with digital camera 100 at the time of shooting of the unsent image data, digital camera 100 automatically transfers the unsent image data to smartphone 200 that has the new connection. On the other hand, when smartphone 200 that has the new connection is different from the apparatus having been connected with digital camera 100 at the time of shooting of the unsent image data, digital camera 100 is forbidden to automatically transfer the unsent image data to smartphone 200 that has the new connection.

The exemplary embodiment further discloses a digital camera that is configured as described below. The digital camera includes CMOS image sensor 115, memory card 142, Bluetooth module 160, Wi-Fi module 155, and controller 135.

CMOS image sensor 115 captures a subject image to generate image data. Memory card 142 stores the image data generated by CMOS image sensor 115. Bluetooth module 160 is capable of pairing with a plurality of external apparatuses (a process for mutually authenticating as communication counterparts), and automatically establishes a connection with one external apparatus authenticated and performs communication with the one external apparatus authenticated. Wi-Fi module 155 automatically transfers the image data generated by CMOS image sensor 115 to an external apparatus. Controller 135 controls the automatic transfer of image data to an external apparatus. Controller 135 sets a destination of each image data generated by CMOS image sensor 115.

Such a configuration can prevent the digital camera from transmitting an unsent image to an apparatus that is different from an external apparatus having been connected with the digital camera at the time of shooting of the unsent image.

Other Exemplary Embodiments

The first exemplary embodiment has been described above as an example of the technique disclosed in the present application. However, the technique according to the present disclosure is not limited to the first exemplary embodiment, and may be applicable to other exemplary embodiments having undergone changes, replacements, additions, omissions, and the like as appropriate. In addition, new exemplary embodiments can be made by combining the constituent elements described in the first exemplary embodiment.

In the exemplary embodiment, an unsent image is automatically transferred to an external apparatus (smartphone 200) when the external apparatus establishes a new connection with digital camera 100. However, a transfer timing of the unsent image is not limited to the above-described timing. The unsent image may be transferred at any timing the user desires after the new connection between digital camera 100 and the external apparatus is established. That is, when the user instructs digital camera 100 to transfer the unsent image, the unsent image may be transferred to the external apparatus. Note that "when the new connection between digital camera 100 and the external apparatus is established" corresponds to when a connection between digital camera 100 and the external apparatus is first broken and then reestablished.

In the exemplary embodiment, one example of unsent-image list 190 has been described, but the configuration of unsent-image list 190 is not limited to the example. For example, although an entry corresponding to an image that has already been transmitted is deleted from unsent-image list 190 (refer to step S53 in FIG. 11), such entry needs not be deleted. At this time, it is necessary to prevent unsent-image list 190 from being completely deleted (step S54 in FIG. 11). In this case, with a flag added to unsent-image list 190, a determination may be made whether an image has been transferred or has not been transferred with reference to the flag. In a case where unsent-image list 190 and the entries are not deleted, when digital camera 100 subsequently establishes a connection again with identical smartphone 200, controller 135 set the flag to a value indicating that image has not been transferred. This configuration allows digital camera 100 to transfer the unsent image.

FIG. 12 illustrates another configuration example of the unsent-image list. Unsent-image list 190*b* illustrated in FIG. 12 includes "INDIVIDUAL AUTHENTICATION INFORMATION" and "FAVORITE FLAG" in addition to the configuration illustrated in FIG. 4.

"INDIVIDUAL AUTHENTICATION INFORMATION" corresponds to information indicating an authentication result of the unsent image. That is, in digital camera 100, a face (specifically, a face image) and a name of a specified user are preregistered. Digital camera 100 analyzes a shot image to determine whether a face that is preregistered is included in the image. In a case where the face that is preregistered is detected, information (for example, name or identification information) on an individual having the face is registered in unsent-image list 190b as "INDIVIDUAL AUTHENTICATION INFORMATION".

"FAVORITE FLAG" corresponds to a flag indicating that an image is selected as "favorite" by the user. Digital camera 100 displays a preview image on liquid crystal monitor 130 so as to allow the user to check a shot image for a predetermined period from immediately after shooting of the image. For example, the user can use operation unit 150 to perform a predetermined operation on the preview image, which sets the image as "favorite". Setting as "favorite" corresponds to marking as "favorite". On unsent-image list 190b, an image set as "favorite" by the user has "FAVORITE FLAG" set to ON. Setting to ON corresponds to, for example, setting "1" to a field of "FAVORITE FLAG".

In a case where controller 135 automatically transfers an image registered in unsent-image list 190b to an external apparatus, controller 135 may transfer only an image that meets a predetermined condition, of images registered in unsent-image list 190b. For example, controller 135 may check "INDIVIDUAL AUTHENTICATION INFORMATION" in unsent-image list 190b and transfer only an image including an image of a predetermined individual preregistered in digital camera 100 to the external apparatus. Alternatively, controller 135 may transfer, to the external apparatus, only an image having "FAVORITE FLAG" set to ON.

Respective unsent-image lists 190, 190b illustrated in FIG. 4, FIG. 12 each correspond to a list used for managing unsent images to be transferred to "DESTINATION" indicating one external apparatus. Such an unsent-image list, as illustrated in FIG. 13, may be used for managing unsent images to be transferred to a plurality of "DESTINATION". In unsent-image list 190c illustrated in FIG. 13, unsent images for two destinations (that is, two external apparatuses) that have respective device names of "smartphone A" and "smartphone B" are managed. In a case where the external apparatus corresponding to "smartphone A" automatically establishes a connection with digital camera 100, controller 135 checks unsent-image list 190c to identify an unsent image shot when the "smartphone A" has been connected with digital camera 100. Then, controller 135 transmits the image data identified to the external apparatus. On the other hand, in a case where the external apparatus corresponding to "smartphone B" automatically establishes a connection with digital camera 100, controller 135 checks unsent-image list 190c to identify an unsent image shot when the "smartphone B" has been connected with digital camera 100. Then, controller 135 transmits the image data identified to the external apparatus.

Furthermore, unsent-image lists 190, 190b, 190c may each include a field indicating a shooting mode of an image. The shooting mode is, for example, a portrait mode or a night scene mode. Digital camera 100 may transfer only an image shot in a specific shooting mode, of a plurality of images shot with digital camera 100, to the external apparatus. Alternatively, digital camera 100 may automatically transfer only an image containing a specific object to the external apparatus. The specific object is, for example, a flower, a dog, or a cat. For this configuration, it is only required that the specific object (for example, a flower, a dog, or a cat) be detected in a shot image by image recognition and the detection result be stored in unsent-image lists 190, 190b, 190c. The detection result may be information indicating whether the specific subject has been detected.

That is, of a plurality of images shot with digital camera 100, only an image that meets the predetermined condition may be transferred to an external apparatus. For this configuration, it is only required that, with reference to unsent-image list 190, information for allowing a determination to be made whether an image meets the predetermined condition be checked. The information may be a shooting condition such as a shooting mode. Alternatively, the information is image analysis result indicating, for example, a detection result of a specific individual or a specific object.

Furthermore, digital camera 100 may be configured not to transfer, in an automatic image transfer process, an image that has passed a predetermined period since shooting of the image. In other words, digital camera 100 may be configured to transfer, to the external apparatus, only an image within the predetermined period since shooting of the image. This configuration allows the user to take only a relatively new image into the external apparatus.

In the exemplary embodiment, although image data is transmitted from digital camera 100 to smartphone 200 over the Wi-Fi connection (via Wi-Fi module 155, 235), the image data may be transmitted over the Bluetooth connection (via Bluetooth modules 160, 240). Over the Bluetooth connection, data transfer requires more time than data transfer over the Wi-Fi connection, but, in a case where an image is small in size or a longer transfer time is allowable for the user, the Bluetooth connection can be used.

Furthermore, in the exemplary embodiment, although digital camera 100 and smartphone 200 are connected with each other over two types of communication, that is, the Bluetooth communication and the Wi-Fi communication, digital camera 100 and smartphone 200 may be connected with each other only over the Wi-Fi communication. In this configuration, when smartphone 200 detects digital camera 100 as an access point of the Wi-Fi communication, smartphone 200 only needs to automatically establish a connection with digital camera 100. Digital camera 100 only needs to acquire information (for example, a device ID) for discriminating smartphone 200 (one example of the external apparatus) over the Wi-Fi communication. This configuration allows digital camera 100 to recognize an apparatus connected to digital camera 100.

In the exemplary embodiment, the smartphone has been given as an example of the external apparatus to be connected to digital camera 100, but the external apparatus is not limited to such a smartphone. Such an external apparatus may be an electronic apparatus capable of communicating with digital camera 100 (for example, a personal computer, a tablet terminal, or a portable telephone).

Furthermore, the digital camera has been given as an example of the imaging device, but the imaging device is not limited to such a digital camera. Such an imaging device may be an electronic apparatus having an image capturing function and a communication function (for example, a video camera, a smartphone, or a tablet terminal).

Furthermore, the digital camera has been given of an example of the communication apparatus, but the communication apparatus is not limited to such a digital camera. Such an imaging device may be an electronic apparatus having a communication function by which image data can be transmitted (for example, a video camera, a smartphone, or a tablet terminal).

Respective controllers 135, 225 of digital camera 100 and smartphone 200 may be each implemented by a central processing unit (CPU), a graphics processing unit (GPU), a micro processing unit (MPU), a field-programmable gate array (FPGA), an application specific integrated circuit (ASIC), or the like.

Furthermore, in the present exemplary embodiment, in step S54 before the end point of the process for transferring an unsent image illustrated in FIG. 11, an unsent-image list is deleted, regardless of whether a smartphone previously having been connected is identical to smartphone 200 that currently has a connection. This configuration can suppress the increase in a number of unsent-image lists to be stored in memory card 142, thereby simplifying the process performed by controller 135. Note that the processing method is not limited to such an embodiment; thus, the unsent-image list need not be deleted. For example, in a case where a smartphone previously having been connected is different from smartphone 200 that currently has a connection, the process may be terminated without deleting the unsent-image list, that is, without step S54. This configuration allows digital camera 100 to transmit an unsent image with reference to the unsent-image list when the smartphone previously having been connected has a connection with digital camera 100 next.

As described above, the exemplary embodiment has been described as an example of a technique according to the present disclosure. The attached drawings and the detailed description have been provided for this purpose.

Therefore, the components described in the attached drawings and the detailed description include not only the components essential for solving the problem but also components that are not essential for solving the problem in order to illustrate the technique. For this reason, even if these unessential components are described in the attached drawings and the detailed description, these unessential components should not be immediately approved as being essential.

Furthermore, since the exemplary embodiment described above is intended to illustrate the technology in the present disclosure, various changes, substitutions, additions, omissions, and the like can be made within the scope of the claims and the scope of equivalents thereof.

The present disclosure is applicable to an imaging device capable of automatically transferring a shot image to another external apparatus.

What is claimed is:

1. An imaging device comprising:
   an imaging unit that images a subject to generate image data;
   a recording medium that stores the image data;
   a communication interface configured to:
      automatically establish a connection with at least one external apparatus including a first external apparatus; and
      communicate with the at least one external apparatus; and
   a controller configured to automatically transfer independent of user input via the communication interface the generated image data to the at least one external apparatus, wherein
      (1) when an unsent piece of the image data to the at least one external apparatus is present in the recording medium, (2) when the communication interface automatically establishes a new connection with the first external apparatus and
         (3) when the first external apparatus is identical to an external apparatus having been connected with the communication interface at a time of generation of the unsent piece of the image data, the controller allows automatic transfer to the first external apparatus via the communication interface the unsent piece of the image data, and
      (1) when the unsent piece of image data to the at least one external apparatus is present in the recording medium, (2) when the communication interface automatically establishes the new connection with the first external apparatus and
         (4) when the first external apparatus is different from an external apparatus having been connected with the communication interface at the time of generation of the unsent piece of the image data, the controller prevents the automatic transfer to the first external apparatus via the communication interface the unsent piece of the image data; and
   wherein the unsent imaging data comprises imaging data that has not previously been transferred from the imaging device.

2. The imaging device according to claim 1, wherein
   the recording medium stores management information used for managing the unsent piece of the image data, and
   the controller checks the management information to identify the unsent piece of the image data to be transmitted to the first external apparatus.

3. The imaging device according to claim 1, wherein the controller allows the communication interface to automatically transfer to the first external apparatus only a piece of the unsent piece of the image data that meets a predetermined condition.

4. The imaging device according to claim 3, wherein the predetermined condition includes at least one of a condition where the piece of the unsent piece of the image data is selected by a user, a condition where the piece of the unsent piece of the image data contains data of a predetermined object, a condition where the piece of the unsent piece of the image data is shot in a predetermined shooting mode, and a condition where a predetermined time has not passed since shooting of the piece of the unsent piece of the image data.

5. The imaging device according to claim 1, wherein the communication interface includes a first communication interface and a second communication interface, the second communication interface being configured to perform higher-speed communication than communication performed by the first communication interface.

6. The imaging device according to claim 5, wherein the first communication interface performs communication in compliance with a Bluetooth (registered trademark) standard, and the second communication interface performs communication in compliance with a Wi-Fi (registered trademark) standard.

7. An image transfer method for transferring image data from a communication apparatus to at least one external apparatus including a first external apparatus, the image transfer method comprising:
   automatically establishing a connection between the communication apparatus and the at least one external apparatus;
   the communication apparatus automatically transferring independent of user input, via the communication apparatus the generated image data to the at least one external apparatus; wherein
      (1) when an unsent piece of the image data to the at least one external apparatus is present in a recording medium, (2) when a new connection is automatically established between the communication apparatus and the first external apparatus and
         (3) when the first external apparatus is identical to an external apparatus having been connected with the communication apparatus at a time of generation of the unsent piece of the image data, the communication apparatus automatically transferring the unsent piece of the image data to the first external apparatus; and (1) when the unsent piece of image data to the at least one external apparatus is present in the recording medium, (2) when the communication apparatus automatically establishes the new connection with the first external apparatus and (4) when the first external apparatus is different from an external apparatus having been connected with the communication apparatus at the time of generation of the unsent piece of the image data, preventing the communication apparatus from automatically transferring the unsent piece of the image data to the first external apparatus.

\* \* \* \* \*